United States Patent [19]

Mori

[11] Patent Number: 4,709,999
[45] Date of Patent: * Dec. 1, 1987

[54] LIGHT RADIATOR

[76] Inventor: Kei Mori, 3-16-3-501, Kaminoge, Setagaya-ku, Tokyo, Japan

[*] Notice: The portion of the term of this patent subsequent to Sep. 2, 2003 has been disclaimed.

[21] Appl. No.: 734,449

[22] Filed: May 15, 1985

[30] Foreign Application Priority Data

Jun. 7, 1984 [JP] Japan ................................ 59-117241

[51] Int. Cl.$^4$ .......................... G02B 5/08; F21V 7/04; F21V 33/00
[52] U.S. Cl. .................................. 350/486; 350/639; 362/32; 362/96; 362/805
[58] Field of Search ............... 350/286, 287, 486, 543, 350/544, 626, 632, 639; 362/32, 96, 101, 805

[56] References Cited

U.S. PATENT DOCUMENTS

| 2,767,628 | 10/1956 | Higonnet et al. | 350/486 |
| 3,475,552 | 10/1969 | Makino et al. | 350/486 |
| 3,856,000 | 12/1974 | Chikama | 350/96.26 |
| 4,609,974 | 9/1986 | Mori | 362/32 |

Primary Examiner—Bruce Y. Arnold
Assistant Examiner—Vincent J. Lemmo
Attorney, Agent, or Firm—Jordan and Hamburg

[57] ABSTRACT

A light radiator for effectively diffusing and radiating light rays which have been transmitted through an optical cable or the like outside of said optical conductor cable. The light radiator is comprised of a transparent cylinder; an optical conductor for guiding light rays into the cylinder through one end of it; an optical means that is movably accommodated in the cylinder for reflecting the light rays guided into it from the optical conductor and for radiating them outside of the cylinder; and a driving means for moving the optical means along the axis of the cylinder.

23 Claims, 15 Drawing Figures

LIGHT RADIATOR

BACKGROUND OF THE INVENTION

The present invention relates to a light radiator for effectively diffusing and radiating light rays which have been transmitted through an optical cable or the like outside of said optical conductor cable.

The present applicant has previously proposed various ways to focus solar rays or artifical light rays by the use of lenses or the like, by guiding the same into an optical conductor cable, and thereby transmitting them onto an optional desired place through the optical conductor cable. The solar rays or artificial light rays transmitted and emitted in such a way are employed for photo-synthesis and for use in illuminating or for other like purposes, as for example to promote the cultivation of plants.

However, in the case of utilizing the light energy for cultivating plants as mentioned above, the light rays transmitted through the optical conductor cable has directional characteristics. Supposing that the end portion of the optical conductor cable is cut off and the light rays are emitted therefrom, the radiation angle for the focused light rays is, in general, equal to approximately 46°. That is quite a narrow field. In the case of utilizing the light energy as described above, it is impossible to perform a desirable amount of illumination by simply cutting off the end portion of the optical conductor cable and by letting the light rays emit from.

Therefore, the present applicant has already proposed various kinds of light radiators capable of effectively diffusing light rays which have been transmitted through an optical conductor cable and radiating the same for illumination over a desired area. The present invention was made forming a link in the chain thereof. In particular, the inventor aims at applying intensified light rays to a desired position of the plants by keeping the light source at a distance to the plants and by moving the light source back and forth in order to supply the light rays over a wider area.

SUMMARY OF THE INVENTION

It is an object of the present invention to provide a light radiator for effectively diffusing and radiating light rays which have been transmitted through an optical cable or the like.

It is another object of the present invention to provide a light radiator capable of effectively emitting solar rays or artifical light rays which have been transmitted through an optical conductor cable outside the same for preferably nurturing plants.

It is another object of the present invention to provide a light radiator suitable for nurturing tall trees for beautifying buildings or for growing plants that have been set in a row on a plane surface.

It is another object of the present invention to provide a light radiator in which the solar rays transmitted through the optical conductor can be effectively diffused to illuminate an area with a wider range.

It is another object of the present invention to provide a light radiator which is preferable to other means for providing light rays from a light source to tall plants as an aid to the photo-synthesis process.

The above-mentioned features and other advantages of the present invention will be apparent from the following detailed description which goes with the accompanying drawings.

DESCRIPTION OF THE PREFERRED EMBODIMENTS

Figure 1:
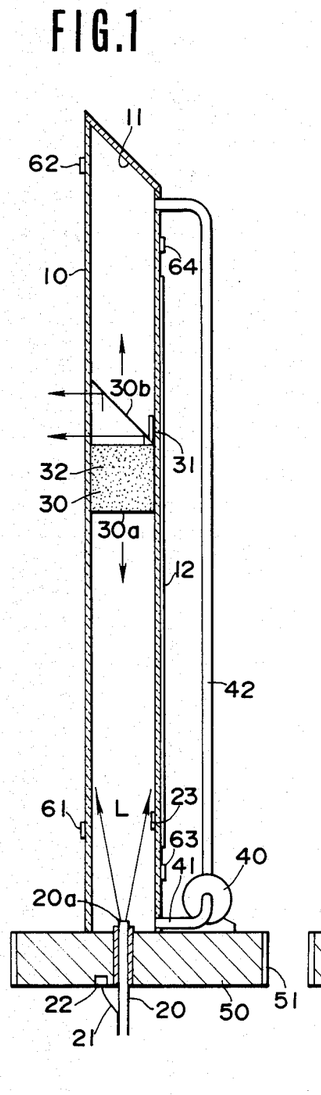
FIGS. 1 and 2 are cross-sectional construction views for explaining embodiments of a light radiator according to the present invention.

FIG. 1 is a cross-sectional view for explaining an embodiment of a light radiator according to the present invention. In FIG. 1, 10 is a transparent cylinder, 20 an optical conductor, 30 an optical means, 40 an air pump, and 50 a foundation. The light-emitting edge 20a of the optical conductor 20 is installed at the lower end portion of the cylinder. The light rays transmitred through the optical conductor 20 are emitted into the cylinder 10 from the light-emitting edge 20a of the optical conductor 20, and transmitted upward by reflecting on the inner and outer wall surfaces of the cylinder 10.

The transparent cylindrical optical means 30 is slidably inserted in the cylinder 10. The lower end surface of the optical means, that is, the surface 30a at the side of where light rays are transmitted, is formed on a plane while the surface 30b at the opposite side thereto is formed on an inclined plane. Therefore, the light rays L guided into the cylinder 10 as mentioned before, enter the optical means 30 through the plane 30a of the optical means 30, and after being reflected onto the inclined surface 30b at the opposite side, the light rays are then emitted outside of the cylinder 10. The trees or the like are raised outside the cylinder 10. In such a manner as mentioned above, the light rays emitted from the cylinder 10 are supplied to the plants as a light source for performing the photo-synthesis process.

The open end of a pipe 41 is located at the lower end portion of the cylinder 10 and the open end of a pipe 42 is located at the upper end portion thereof. A differential pressure is applied between the lower side and the upper side of the optical means 30 by use of pipes 41 and 42. The optical means 30 can move up and down in the cylinder 10 by the action of the above-mentioned differential pressure and the empty weight of the optical means 30. In such a manner, it is possible to supply the light rays to the trees from the lower portion thereof to the upper portion thereof.

In FIG. 1, 61 and 62 are photo sensors mounted on the outer circumferential surface of the cylinder 10 at the side where the right rays reflected by the optical means 30 pass through. The arrival of the optical means 10 at the lower end thereof is detected by the photo sensor 61. The detection signal thereof controls an air pump 40 so as to generate a differential pressure for moving the optical means upward. On the other hand, the arrival of the optical means 10 at the upper end thereof is detected by the photo sensor 62. The detection signal thereof controls an air pump 40 so as to generate a differential pressure for moving the optical means downward this time.

Those photo sensors 61 and 62 are constructed so as to be capable of being removed from the cylinder 10 and to be movable along the cylinder 10. In such a manner, when a tree is small the photo sensor 62 is placed at a lower position thereof, and when the tree grows and becomes taller it can be moved upward. And therefore, the light rays supplied by the optical conductor 20 can be effectively supplied to trees. A reflecting surface installed at the upper end of the cylinder 10 is represented by 11. The light rays leaking upward from the cylinder 10 after passing through the optical means 30 are reflected on the reflecting surface 11 and discharged to the outside portion of the cylinder 10. In such a manner, the surface of the ceiling is illuminated.

A permanent magnet installed at a position where the passage of the light rays, reflected on the reflection surface 30b of the outer circumferential surface of the optical means 30, are not disturbed at all is represented by 31. When such a permanent magnet or magnetic substance is unitarily installed on the optical means 30, it is possible to detect its position by sensing the permanent magnet or magnetic substance 31. On this occasion, magnetic sensors 63 and 64 can be used instead of the afore-mentioned photo sensors 61 and 62. Furthermore, the signal detected by the magnetic sensors 63 and 64 is used for controlling the air pump 40 as is the case of the photo sensors in order to move up and down the optical means 30.

A permanent magnet (or magnetic substance) installed on the outer surface of the cylinder 10 and elongated along the axis of the cylinder 10 is represented by 12. The optical means 30 is regulated so as to put it in a desired direction by use of a permanent magnet or magnetic substance 12. Either one of the permanent magnets or magnetic substances 31, installed on the optical means 30 and the permanent magnet (or magnetic substance) 12 installed on the cylinder 10 is constructed together with the permanent magnet. As a consequence, a magnetic force occurs between those permanent magnets (or magnetic substances) 31 and 12. The optical means 30 therefore moves up and down through the magnetic force. The permanent magnet (or permanent substance) 31 is opposite to the permanent magnet (or magnetic substance) 12 on the cylinder 10.

In the case of the embodiment shown in FIG. 1, the permanent magnet (or magnetic substance) 12 is installed in such a way that the optical means 30 moves up and down linearly without any rotational motion. When the permanent magnet or magnetic substance 12 is installed spirally around the cylinder 10, the optical means 30 moves up and down with a rotational movement. When the same is installed in a state of zigzag, the optical means 30 moves up and down rotatably, i.e. performing a goose-neck movement to the right and to the left.

Generally, speaking branches of trees spread out widely at the lower levels, but the higher the branches are the area narrows down. For this reason, the angle of the goose-neck movement of the optical means 30 is set wide at the lower portion of the trees and becomes gradually smaller from the bottom to the top thereof. In such a manner, it may be possible to effectively supply light rays to plants. Therefore, preferably, the width of the zigzag movement is widened at the lower portion of the plant and narrowed at the upper portion thereof. Furthermore, the movement in an up-and-down direction can be slowed down at the lower portion and sped up at the upper portion.

Figure 3:
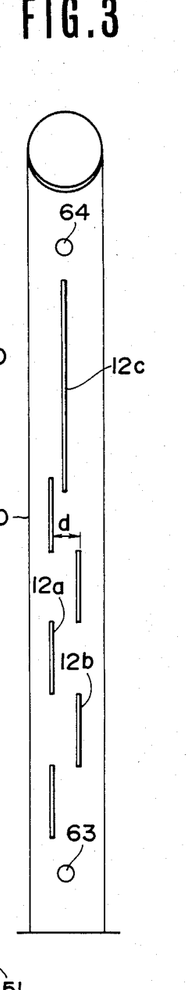
FIG. 3 is a view showing an example of a method for arranging magnetic substances 12.

The case for installing the magnetic substance 12 in continuous fashion has been described heretofore. However, as shown in FIG. 3, it may be possible to install two rows of magnetic substances 12a and 12b in parallel fashion and in a state of zigzag. In such a case, the distance d between those rows is widened at the lower position, and narrowed at the upper position, and only one row of magnetic substances 12c is installed at the uppermost portion. When the optical means 30 moves up and down at the lower position, it performs a goose neck movement between 12a and 12b. On the contrary, at the upper position it moves up and down in a linear way without performing the goose neck movement. In such a manner, the light rays can be effectively supplied to trees.

As mentioned heretofore, the optical means 30 is guided by use of a permanent magnet (or magnetic substance). However, the present invention is not limited to the aforementioned embodiment. For instance, a projection (or a groove) is formed on the optical means, and a groove (or a projection) is elongated along the axis of the cylinder 10 and formed on the inner wall of the cylinder 10, and as is easily understood, the optical means 30 can be guided by engaging the groove with the projection, and vice versa.

An optical fiber diverging from the optical conductor 20 and taken outside therefrom is represented by 21. A photo sensor 22 is mounted on the tip end portion of the optical fiber 21. By means of the photo sensor 22, the light rays supplied in the optical conductor 20 are detected. At the time of detecting the light rays, the pump 40 is driven while at the time of non-detection it is stopped.

Moreover, in addition to the above-mentioned detection of the light rays, the light rays supplied from the optical conductor 20 are detected by the photo sensor 23 installed in the cylinder 10, and the pump 40 is controlled by a detection signal. There are various detection methods as mentioned heretofore.

There are two kinds of trees; they are, a positive tree and a negative tree. The positive tree requires a large amount of light rays while the negative tree does not require such a large amount of light rays. If the amount of light rays supplied is changed in accordance with the kind of trees, they can be more effectively utilized. Consequently, for instance, a plurality of holes for inserting the optical conductor were previously bored on the foundation 50. In the case of positive tree, plural optical conductors 20 are connected with the single cylinder 10. In the case of the negative tree, a lesser number of optical conductors are connected therewith.

When solar rays are not present, artificial light rays are employed. When a very small amount of solar rays exist, artificial light rays can be supplemented in addition to the solar rays. Silicone rubber covering the outer circumferential portion of the optical means 30 where the light rays, reflected by optical means 30, do not pass through, is represented by 32. In such a manner, by covering the optical means 30 by the use of silicone rubber, the slidability between the optical means 30 and the cylinder 10 is improved, and therefore the inner wall surface of the cylinder 10 is not injured.

Furthermore, a gear mounted on the cirumferential portion of the foundation 50 is represented by 51. For instance, motor power is transmitted to the foundation 50 by means of a motor not shown in the drawing through the medium of a gear 51 in order to rotate (or rotatably move) the foundation 50. At this time, the cylinder 10 rotates together with the foundation 50. As a result, the direction of the light rays emitted from the cylinder 10 changes. Therefore, the direction of the light rays can be changed not only up and down but also in the direction of the angle of the rotation so that the light rays can illuminate a wider area.

Figure 2:
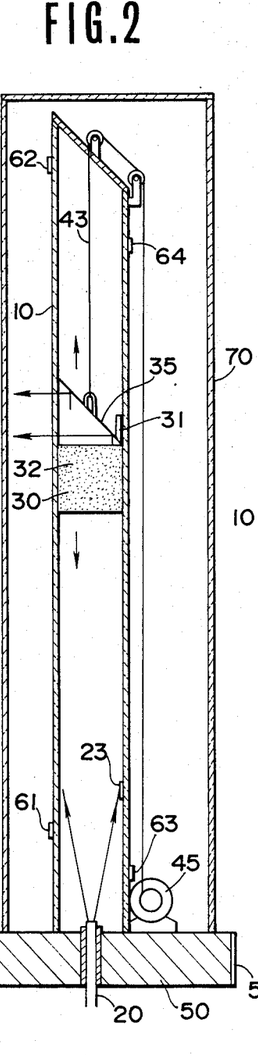

FIG. 2 is a cross-sectional construction view for explaining another embodiment of the present invention. In FIG. 2, the reference numeral which is the same as that of FIG. 1 is attached to the part performing the same action as that shown in FIG. 1. However, in this embodiment, a string 43 and a motor 45 (adjusting the length of the string 43) are used for moving the optical means 30. Furthermore, the inclined surface of the optical means is formed as a reflecting surface for the purpose of minimizing the loss of light rays due to the connection of the string with the optical means. As regards all other aspects, this embodiment is the same as that shown in FIG. 1. However, on that occasion, it is dangerous if the string 43 moves up and down. Therefore, the entire portion of the light radiator is preferably accommodated inside the transparent protective tube 70 as shown in FIG. 2. As a matter of course, it may be easily understood that the protective tube 70 can be applied to the embodiment shown in FIG. 1.

Figure 4:
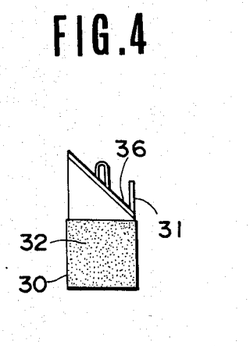
FIG. 4 is a view showing another embodiment of the optical means according to the present invention.

FIG. 4 is a view showing still another embodiment of the optical means 30. In this embodiment, a reflecting plate 36 is fixed by means of an adhesive on the side of the inclined surface 30b of the optical means 30. In such a manner, when the optical means is moved by the use of the string, the connection of the string and the optical means becomes more secure.

Different embodiments of the present invention have been described heretofore. However, the present invention is not limited to the embodiments mentioned above. For instance, it is possible to employ the optical means of the embodiment shown in FIG. 1 instead of that of the embodiment shown in FIG. 2. On the contrary, it is possible to employ the optical means of the embodiment shown in FIG. 2 instead of the other one shown in FIG. 1. The case of employing the cylinder set up vertically has been described heretofore, however it may be easily understood that the cylinder can be employed in a state of being set up horizontally or in being suspended, according to its application.

As a matter of course, on that occasion, the strings are connected with both ends of the optical means 30 and either one of the strings needs to be pulled at the time of its movement in the embodiment shown in FIG. 2.

Figure 5:
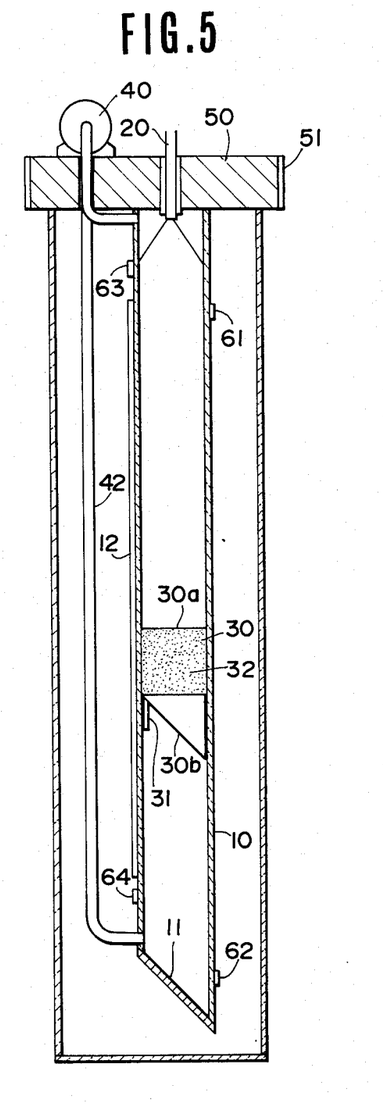
FIGS. 5 through 7 are other embodiments of the present invention, respectively.

FIG. 5 is a cross-sectional view showing an embodiment in which the light radiator as shown in FIG. 1, is employed in a state of being suspension. The operational function is the same as that of the light radiator shown in FIG. 1. The reference numeral is the same as that of FIG. 1 and is attached to the part performing the same action as that in FIG. 1. The detailed description about its operational function is omitted.

In general, an electric lamp hung down from the ceiling illuminates the lower portion. By use of such a suspended lamp, it becomes possible to perform illumination equal to daylight. When the lowermost portion to be illuminated is higher than the height of a human, the light rays can illuminate trees without taking any floor space. There exists only a trunk at the bottom portion of a high tree. Specifically, there exists no leaves or a very few leaves at that level. This portion does not need the light rays so much. In that a sense, this method of illumination is preferable to others.

Figure 6:
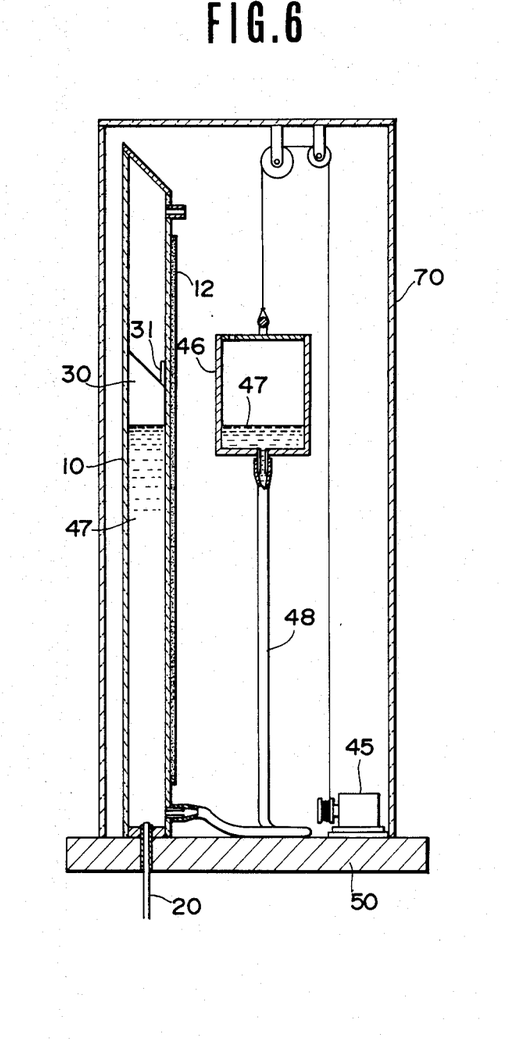

FIG. 6 is a cross-sectional construction view for explaining another embodiment of the present invention. In FIG. 6, the reference numeral, the same as that of FIGS. 1 and 2, is attached to the part performing the same action as that in the embodiment shown in FIGS. 1 and 2. In this embodiment, 46 is a tank, 47 is an optically transparent oil, and 48 is a flexible hose. One end of the flexible hose 48 is connected with the bottom portion of the tank 46 while another end thereof is connected with the lower end of the cylinder. The optical means 30 floats on the optical oil 47 contained in the cylinder 10.

Consequently, in the case of this embodiment, the tank 46 is moved up and down by the motor 45, and thereby the liquid level of the optical oil 47 in the cylinder 10 changes in accordance with the up-and-down movement of the tank 46. The optical means 30 also moves up and down following the liquid level change thereof.

Figure 7:
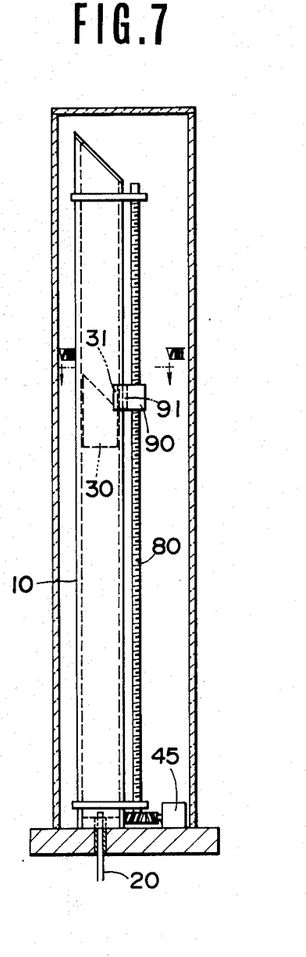
Figure 8:
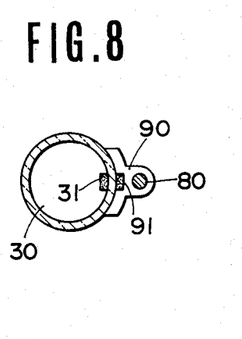
FIG. 8 is an enlarged cross-sectional view taken along the section line VIII—VIII of FIG. 7.

FIG. 7 is a cross-sectional construction view for explaining another embodiment of the present invention. FIG. 8 is an enlarged cross-sectional view taken along the section line VIII—VIII of FIG. 7. In FIGS. 7 and 8, 80 is a rod screw, 90 a magnet holder, and 91 a permanent magnet. A permanent magnet or magnetic substance 31 is installed in the optical means 30 so as to be opposite to the permanent magnet 91. The magnet holder 90 comes into contact with the outer circumferential surface of the cylinder 10. In such a manner, the magnet holder 90 is prevented from moving rotatably. In consequence, when the rod screw 80 is rotated by the motor 45, the magnet holder 90 moves up and down in accordance with the direction of the rotational movement of the rod screw 80. The optical means 30 also moves up and down following the up-and-down movement of the magnet holder 90.

As mentioned heretofore, in this embodiment, the magnet holder 90 is moved up and down, and thereby the optical means 30 is also moved up and down by utilizing the magnetic force acting between the permanent magnet 91, supported by the magnet holder 90, and the permanent magnet (or magnetic substance 31) mounted on the optical means 30. The movement area of the optical means can be set to a desirable range by use of a photo sensor or a magnetic sensor as is the case in the afore-mentioned embodiment. Otherwise, a limit switch for detecting the upper limit position and the lower limit position of the magnet holder is installed adjustably so as to position the setting point thereof, or the movement area is determined by counting the number of revolutions of the motor 45.

Figure 9:
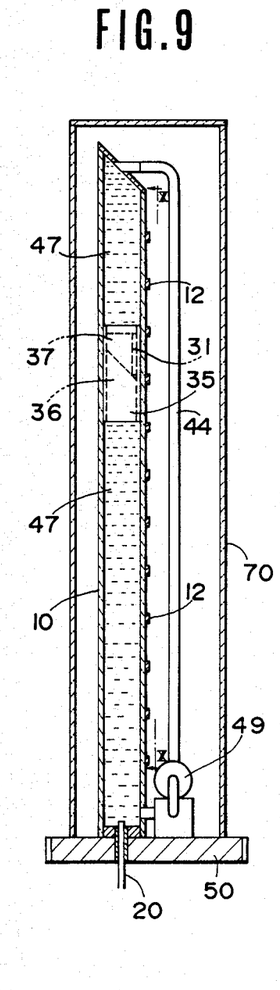
FIG. 9 is a construction view showing another embodiment of the present invention.

FIG. 9 is a cross-sectional construction view of another embodiment of the present invention. In FIG. 9, 44 is an optical oil supplying pipe, and 49 a fluid pump.

The cylinder 10 is filled with optical oil 47 and the optical means 30 floats on the optical oil 47. Consequently, if the liquid pump 49 is driven so as to let the optical oil 47 move to a lower side of the optical means 30, the optical means 30 moves upward. On the contrary, if the liquid pump 49 is driven so as to let the optical oil 47 move to an upper side of the optical means 30, the optical means 30 moves downward. Moreover, the movement area thereof at that time can be set to an optional range by use of the photo sensor, the magnetic sensor, or the like just as in the afore-mentioned embodiment.

Figure 10:
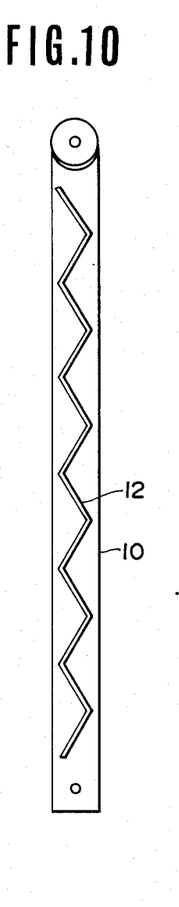
FIG. 10 is a view as seen along the line X—X of FIG. 9.

FIG. 10 is a cross-sectional view as seen along line X—X of FIG. 9. In FIG. 10, 12 is a magnetic substance arranged on the outer circumferential surface of the cylinder 10 in zigzag fashion. In such a manner as mentioned above, when the optical means 30 moves up and down, the permanent magnet 31 mounted on the optical means 30 rotatably moves up and down along the zigzag lines of the magnetic substance 12. Therefore, the direction of the light rays emitted from the optical means 30 changes with respect to the radius direction of the cylinder 10.

As a matter of course, in this embodiment, the magnetic substance 12 can be arranged in the form of zigzag lines as shown in FIG. 3. Furthermore, it may be easily understood that the magnetic substance 12 can be arranged by winding it spirally around the cylinder 10.

Figure 11:
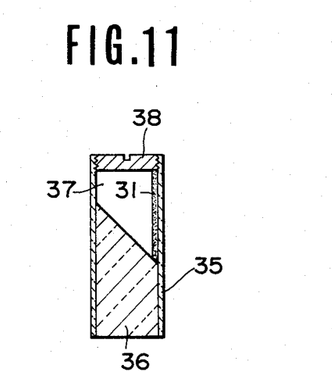
FIGS. 11 and 12 are views showing embodiments of optical means, respectively.
Figure 12:
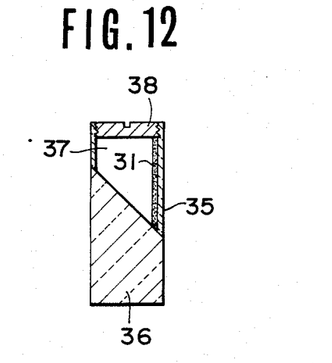

FIGS. 11 and 12 are the cross-sectional views showing an embodiment preferably for use in the light radiator shown in FIG. 9. In this embodiment of FIG. 11, the transparent cylinder 36 is tightly inserted into the cylinder 35. The upper portion of the transparent cylinder 36 is an air chamber 37. The upper end portion of the cylinder 35 is closed by a cover 38. As shown in FIGS. 11 and 12, the cover 38 is engaged with the cylinder 35, and the volume of the air chamber 37 can be adjusted by screwing the cover 30 therein. In such a manner, the gravity of the optical means 30 can be adjusted.

As a consequence, the specific gravity thereof can be made equal to that of the optical oil. If both of their specific gravities are equal to each other, the optical means 30 does not fall down as a result of its empty weight, and consequently, it can be moved up and down by a smaller driving force. Furthermore, it may be possible to perform more easily a rotational movement by the action of the permanent magnet 31 and the magnetic substance 12 because of less friction. In the case of the embodiment shown in FIG. 12, the diameter of the cylinder 35 is equal to that of the transparent cylinder 36. Both of those cylinders 35 and 36 are joined to each other in series. In such a manner, the diameter of the transparent cylinder 36 turns out to be larger compared with the embodiment as shown in FIG. 11. Therefore, the light rays transmitted through the cylinder 10 can be effectively radiated.

Figure 13:
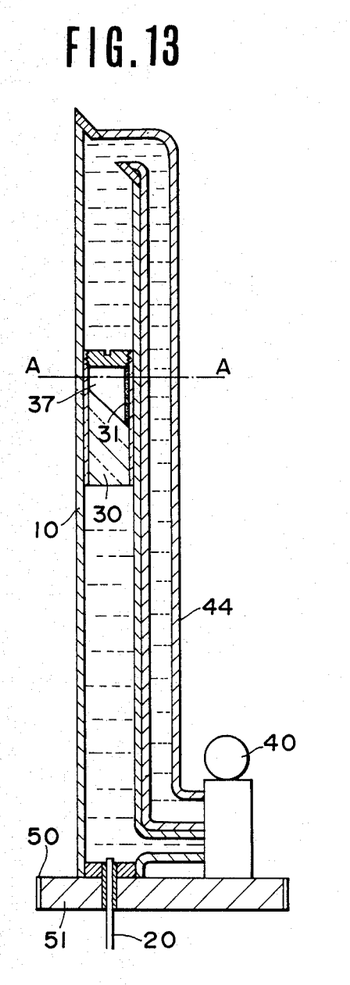
FIG. 13 is a cross-sectional view showing another embodiment of the present invention.

FIG. 13 is a cross-sectional construction view showing another embodiment of the present invention. In this embodiment, both of the cylinder 10 and the optical oil supplying tube 44, as shown in FIG. 9, are pre-constructed unitarily for easier handling. The operational theory thereof is completely the same as that of the embodiment shown in FIG. 9.

Figure 14:
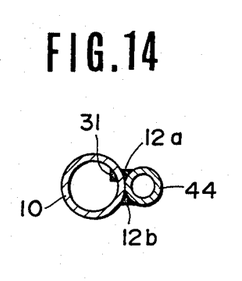
FIG. 14 is a cross-sectional view taken along the section line A—A of FIG. 13.

FIG. 14 is a cross-sectional view taken along the section line A—A of FIG. 13. In this embodiment, the permanent magnets or magnetic substances 12, divided into the portions 12a and 12b, are arranged in zigzag fashion at the side of the optical oil supplying pipe 44 so as to hold it therebetween, as shown in FIG. 14. In such a manner, the optical means 30 is guided as was the case of FIG. 3.

Figure 15:
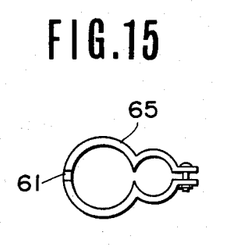
FIG. 15 is a plane view showing an example of a photo sensor holder.

FIG. 15 is a cross-sectional view showing a holder 65 for holding a photo sensor 61 or 62. The holder 65 is a band for unitarily surrounding the cylinder 10 and the optical oil supplying pipe 44. The photo sensor 61 or 62 is installed at the position corresponding to the emission side of the light rays in the cylinder 10. The holder 65 can be fastened to the opposite side, i.e. the portion surrounding the optical oil supplying pipe.

As a consequence, in order to adjust the position for mounting the photo sensor, the holder can be moved along the cylinder 10 and fixed at the desired position. Therefore, the movement range of the optical means can be easily adjusted. Especially, in this embodiment, it may be possible to employ the light radiator in a horizontal state or a vertical one, and with inclined equipment at an optional desired angle. Furthermore, it may be possible to employ the same in a state of non-gravity in universal space or the like. The above-mentioned light radiator is especially suitable for employment in universal space because the construction thereof is small and durable (i.e. strong in construction) and the optical means is moved by use of oil pressure.

As is apparent from the foregoing description, according to the present invention, it is possible to provide a light radiator in which the solar rays transmitted through the optical conductor can be effectively diffused to illuminate an area with a wider range. In particular, the light radiator according to the present invention, is preferable for providing light rays to tall plants from a light source assist in the photo synthesis process. Furthermore, since the light source moves, bright and dim light rays can be repeatedly and alternatingly supplied to plants suitably and thereby promote the photo synthesis action performed by the plants themselves.

I claim:

1. A light radiator comprising a transparent cylinder, an optical conductor for guiding light rays into said cylinder through one end of said cylinder, an optical means which is movably accommodated inside of said cylinder for reflecting said light rays which have been guided into said cylinder from said optical conductor and then radiating said light rays outside said cylinder, and driving means for moving said optical means along the axis of said cylinder, said optical means being constructed with a cylindrical transparent member having an edge surface formed on a plane and another edge surface formed on an inclined plane.

2. A light radiator as defined in claim 1 further comprising is a reflecting film formed on the inclined surface of said optical means.

3. A light radiator as defined in claim 1 further comprising a reflecting plate is fixed on said inclined surface of said optical means by the use of an adhesive.

4. A light radiator as defined in claim 1 further comprising silicone rubber on the outer circumferential surface of said optical means such that said silicone rubber does not prevent light rays from passing through said optical means and being radiated outwardly of said cylinder.

5. A light radiator as defined in claim 1 further comprising a permanent magnet located at an outer circumferential position of said optical means, such that said magnet does not prevent light rays from passing through the optical means and being radiated outwardly of said cylinder.

6. A light radiator as defined in claim 1 further comprising a magnetic substance on the outer circumferential surface of said cylinder.

7. A light radiator as defined in claim 6, wherein said magnetic substance is arranged in the form of an elongated band extending without interruption, in the direction of said cylinder's axis.

8. A light radiator as defined in claim 6, wherein said magnetic substance is arranged in zigzag fashion relative to the direction of said cylinder's axis.

9. A light radiator as defined in claim 1 wherein said cylinder has an inclined reflecting surface at one end portion and at the opposite side to where said optical conductor of said cylinder is installed.

10. A light radiator as defined in claim 1, wherein said cylinder is rotatable.

11. a light radiator, is characterized in that said light radiator is comprised of a transparent cylinder, an optical conductor for guiding light rays into said cylinder through one end of said cylinder, an optical means which is movably accommodated inside of said cylinder for reflecting said light rays which have been guided into said cylinder from said optical conductor and radiating said light rays outside said cylinder, and a driving means for moving said optical means along the axis of said cylinder, said driving means having a tank containing optically transparent oil, a flexible hose connected with the lower end of said cylinder and said tank, and a means for moving up and down said tank, said optical means floating on optically transparent oil inside of said cylinder.

12. A light radiator, is characterized in that said light radiator is comprised of a transparent cylinder, an optical conductor for guiding light rays into said cylinder through one end of said cylinder, an optical means which is movably accommodated inside of said cylinder for reflecting said light rays which have been guided into said cylinder from said optical conductor and radiating said light rays outside of said optical and a driving means for moving said optical means along the axis of said cylinder, said driving means consisting of a rod screw which is inserted and mounted in parallel fashion with said cylinder, a motor for rotating said rod screw, a magnet supporting body engaged with said rod screw and prevented from rotating by said cylinder, a permanent magnet mounted on said magnet supporting body, and a permanent magnet or magnetic substance mounted on said optical means said optical means moving up and down following the movement of said magnet supporting body.

13. A light radiator, is characterized in that said light radiator is comprised of a transparent cylinder, an optical conductor for guiding the light rays into said cylinder through one end of said cylinder, an optical means that is movably accommodated inside of said cylinder for reflecting said light rays which have been guided into said cylinder from said optical conductor and radiating said light rays outside of said cylinder, and a driving means for moving said optical means along the axis of said cylinder, said driving means includes optically transparent oil placed in said cylinder and a liquid pump which has one end connected with the other end of said cylinder, said optically transparent oil being displaced in said cylinder by use of said liquid pump.

14. A light radiator as defined in claim 13, is characterized in that said optical means includes a permanent magnet and a magnetic substance which is mounted on the outer surface of said cylinder.

15. A light radiator as defined in claims 13 or 14, is characterized in that said optical means has an air chamber, and the size of said air chamber is changeable.

16. A light radiator as defined in, claim 13 further comprising an optically transparent oil supplying pipe for supplying optically transparent oil to said cylinder, said pipe and said cylinder being unitarily constructed.

17. A light radiator comprising a transparent cylinder, an optical conductor for guiding light rays into said cylinder through one end of said cylinder, a cylindrical optical means which is movably accommodated inside of said cylinder for reflecting said light rays which have been guided into said cylinder from said optical conductor and then radiating said light rays outside said cylinder, and driving means for moving said optical means along the axis of said cylinder, said driving means comprising a generator for producing a differential pressure applied between both ends of said cylinder.

18. A light radiator comprising a transparent cylinder, an optical conductor for guiding light rays into said cylinder through one end of said cylinder, a cylindrical optical means which is movably accommodated inside of said cylinder for reflecting said light rays which have been guided into said cylinder from said optical conductor and then radiating said light rays outside said cylinder, driving means for moving said optical means along the axis of said cylinder, said driving means comprising a string connected with at least one end of said optical means, said optical means being moved in said transparent cylinder by pulling said string.

19. A light radiator as defined in claim 18 said cylinder and said string are claim 18 wherein accommodated inside of a transparent protective pipe.

20. A light radiator comprising a transparent cylinder, an optical conductor for guiding light rays into said cylinder through one end of said cylinder, a cylindrical optical means which is movably accommodated inside of said cylinder for reflecting said light rays which have been guided into said cylinder from said optical conductor and then radiating said light rays outside said cylinder, driving means for moving said optical means along the axis of said cylinder, and two photo sensors along the axis of said cylinder on the outer circumferential portion of said cylinder, the light rays being reflected by said optical means being detected by the use of said photo sensors in order to control said driving means and thereby changing the direction of said optical means.

21. A light radiator as defined in claim 20, wherein the position of said photo sensor can be adjusted along the axis of said cylinder.

22. A light radiator comprising a transparent cylinder, an optical conductor for guiding light rays into said cylinder through one end of said cylinder a cylindrical optical means which is movably accommodated inside of said cylinder for reflecting said light rays which have been guided into said cylinder from said optical conductor and then radiating said light rays outside said cylinder, driving means for moving said optical means along the axis of said cylinder, two magnetic sensors axially spaced on the outer circumferential portion of said transparent cylinder, and a permanent magnet or magnetic substance on said optical means which is detected by said magnetic sensors in order to control said driving means and thereby control the direction of said optical means.

23. A light radiator as defined in claim 22, wherein the position of said magnetic sensor is adjustable along the axis of said cylinder.

* * * * *